US012579066B2

(12) United States Patent
Dahiya et al.

(10) Patent No.: US 12,579,066 B2
(45) Date of Patent: Mar. 17, 2026

(54) DATA DRIVEN CACHING STRATEGY

(71) Applicant: Oracle International Corporation,
Redwood Shores, CA (US)

(72) Inventors: Aneesh Dahiya, Zurich (CH); Renata Khasanova, Zurich (CH)

(73) Assignee: Oracle International Corporation,
Redwood Shores, CA (US)

( * ) Notice: Subject to any disclaimer, the term of this patent is extended or adjusted under 35 U.S.C. 154(b) by 48 days.

(21) Appl. No.: 18/731,851

(22) Filed: Jun. 3, 2024

(65) Prior Publication Data

US 2025/0370929 A1      Dec. 4, 2025

(51) Int. Cl.
*G06F 12/00* (2006.01)
*G06F 12/0802* (2016.01)
(52) U.S. Cl.
CPC ................................. *G06F 12/0802* (2013.01)
(58) Field of Classification Search
CPC .............. G06F 12/0802; G06F 12/123; G06F 2212/60; G06N 3/08; G06N 20/00
See application file for complete search history.

(56) References Cited

U.S. PATENT DOCUMENTS

| | | |
|---|---|---|
| 6,266,742 B1 | 7/2001 | Challenger |
| 6,754,662 B1 | 6/2004 | Li |
| 9,773,026 B1 | 9/2017 | Tetreault |
| 10,685,295 B1 | 6/2020 | Ross |
| 12,045,698 B1 | 7/2024 | May |
| 2003/0225974 A1 | 12/2003 | Bopardikar |
| 2010/0332436 A1 | 12/2010 | Yanagisawa |
| 2012/0042126 A1 | 2/2012 | Krick |
| 2012/0051537 A1 | 3/2012 | Chishti |
| 2015/0067088 A1 | 3/2015 | Guerin |
| 2015/0095581 A1 | 4/2015 | Stairs |
| 2016/0077926 A1 | 3/2016 | Mutalik |
| 2016/0246733 A1 | 8/2016 | Condict |
| 2017/0192892 A1* | 7/2017 | Pundir .................. G06F 3/0644 |

(Continued)

OTHER PUBLICATIONS

O'Neil et al., "The LRU-K Page Replacement Algorithm for Database Disk Buffering", SIGMOD Rec., Jun. 1993, vol. 22, No. 2, p. 297-306.

(Continued)

*Primary Examiner* — Shawn X Gu
(74) *Attorney, Agent, or Firm* — Hickman Becker Bingham Ledesma LLP; Stephen J. Walder, Jr.

(57) ABSTRACT

A computer-implemented method includes receiving an input for a model from a data stream, computing an output from the model, and storing the input and the output as an element of a cache. The method also includes using an algorithm to determine a set of parameters associated with the cache; the algorithm optimizes a function including a time taken by the model to generate outputs from a set of inputs sampled from the data stream. The method further includes calculating a caching score associated with each cache element, based on the set of parameters and the time taken by the model to generate the output, a usage of the element expressed as a number of iterations over which the element has been retained in the cache, and a frequency of usage of the element. The method also includes subsequently removing from the cache the element having the lowest caching score.

19 Claims, 6 Drawing Sheets

(56) References Cited

U.S. PATENT DOCUMENTS

| 2017/0315932 A1 | 11/2017 | Moyer |
| 2019/0303480 A1 | 10/2019 | Canis |
| 2021/0073808 A1 | 3/2021 | Gu |
| 2022/0051088 A1 | 2/2022 | Meng |
| 2023/0079746 A1 | 3/2023 | Chen |

OTHER PUBLICATIONS

Cormen et al., "Intorduction to Algorithms", The Mit Press, Massachusetts Institute of Technology, 2022, pp. 161-182.
Bojanowski et al., "EnrichingWord Vectors with Subword Information", arXiv:1607.04606v2 [cs.CL], Jun. 19, 2017, 12 pages.
Sanders et al., "A Baysian Approach for the Robust Optimisation of Expensive-To-Evaluate Functions" IEEE Transactions on Evolutionary Computation, May 9, 2019 (12 pages).

* cited by examiner

Receive inputs:
Data samples
(index *c*)        102

*c* at
limit value ?
104

Y

Find parameters
α, β, Υ
107

N

Compute output:
Compute time *t*
106

Bayesian
optimization for
parameters    109

Organize cache
according to
compute time *t*
108

Organize cache
according to
optimized parameters
111

100

200

300

DATA DRIVEN CACHING STRATEGY

CROSS-REFERENCE TO RELATED APPLICATIONS

This application is related to U.S. application Ser. No. 18/403,946, titled "Caching Strategy Based On Model Execution Time", filed Jan. 4, 2024, and to U.S. application Ser. No. 18/632,946, titled "Caching Strategy Based On Model Execution Time, Frequency and Input Order with Configurable Priority", filed Apr. 11, 2024, which are incorporated herein by reference in their entirety.

FIELD OF THE INVENTION

The present invention relates to computing with large datasets, and more particularly to a data driven caching scheme.

BACKGROUND

Many applications use large data collections, which often consist of repetitive samples. For example, machine generated database logs, social networks, web search or medical reports often contain a large proportion of duplicated content; it is not known in advance which samples are duplicated. Running an algorithm on such duplicated samples results in unnecessary calculations. One way to improve computational time for a dataset with repetitive samples is to use caches. Cache is an auxiliary memory which allows high-speed retrieval.

A Least Recently Used (LRU) caching algorithm is commonly used. In LRU caching, elements are added to the cache until cache capacity is reached. When that happens, the least recently used sample is replaced with the new incoming sample. Least Frequently Used (LFU) is another caching strategy. LFU is similar to LRU, with the differentiating factor being frequency of input of an element. In LFU, the least frequent element is replaced by a new incoming element. However, in situations where inference execution time varies widely among different samples, LRU and LFU lead to cache behavior that is not optimal, since LRU and LFU can focus attention on elements that are easy to recalculate instead of elements that require greater amounts of computational power.

Another caching strategy focuses on execution time (that is, the time required to generate an output from a given new input). This strategy can also lead to suboptimal performance for some workloads where frequency and order of the inputs play an important role.

In a further caching strategy, a combination of execution time, order and frequency of a given sample is used to define more efficient caching behavior. This approach requires that parameters be chosen based on data distribution. It may be difficult to learn the data distribution in advance; additional time thus may be required to search for the appropriate parameters.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In accordance with aspects of the disclosure, a strategy to cache a data element (the input i and output o of a deterministic model) may be based on the computation time required to generate output o from the model, the usage of the element in the cache, and/or a frequency of appearance of the element. A deterministic model generates the same output o for a given input i; for example, deterministic machine learning (ML) model inference, extracting information from database, etc. This results in improved execution time for deterministic models, when the model encounters the same inputs over a period of time (as is usual in numerous applications). When an input i is first encountered, the computed output o from the model is saved in the cache; in various embodiments, the cache is represented by a hashmap, where the key is input i and the value is output o. When the same input is encountered again, the output is fetched from the cache instead of recomputing. This saves computational resources, particularly when the underlying model is large.

In various embodiments, a caching score $s_c$ is calculated for each input element i. This score is calculated based on the execution time, the retention of the element (the number of iterations over which the element has been retained in the cache), and a frequency of appearance of the element:

$$s_c = \alpha s_t + \beta s_r + \gamma s_f$$

where $s_t$, $s_r$, and $s_f$ are normalized scores for the execution time, retention and frequency, and $\alpha$, $\beta$, $\gamma$ are scaling weights for the corresponding normalized scores. The parameters $\alpha$, $\beta$, $\gamma$ depend on the data distribution, which is not known in advance.

Figures 1, 2, 3, 4:
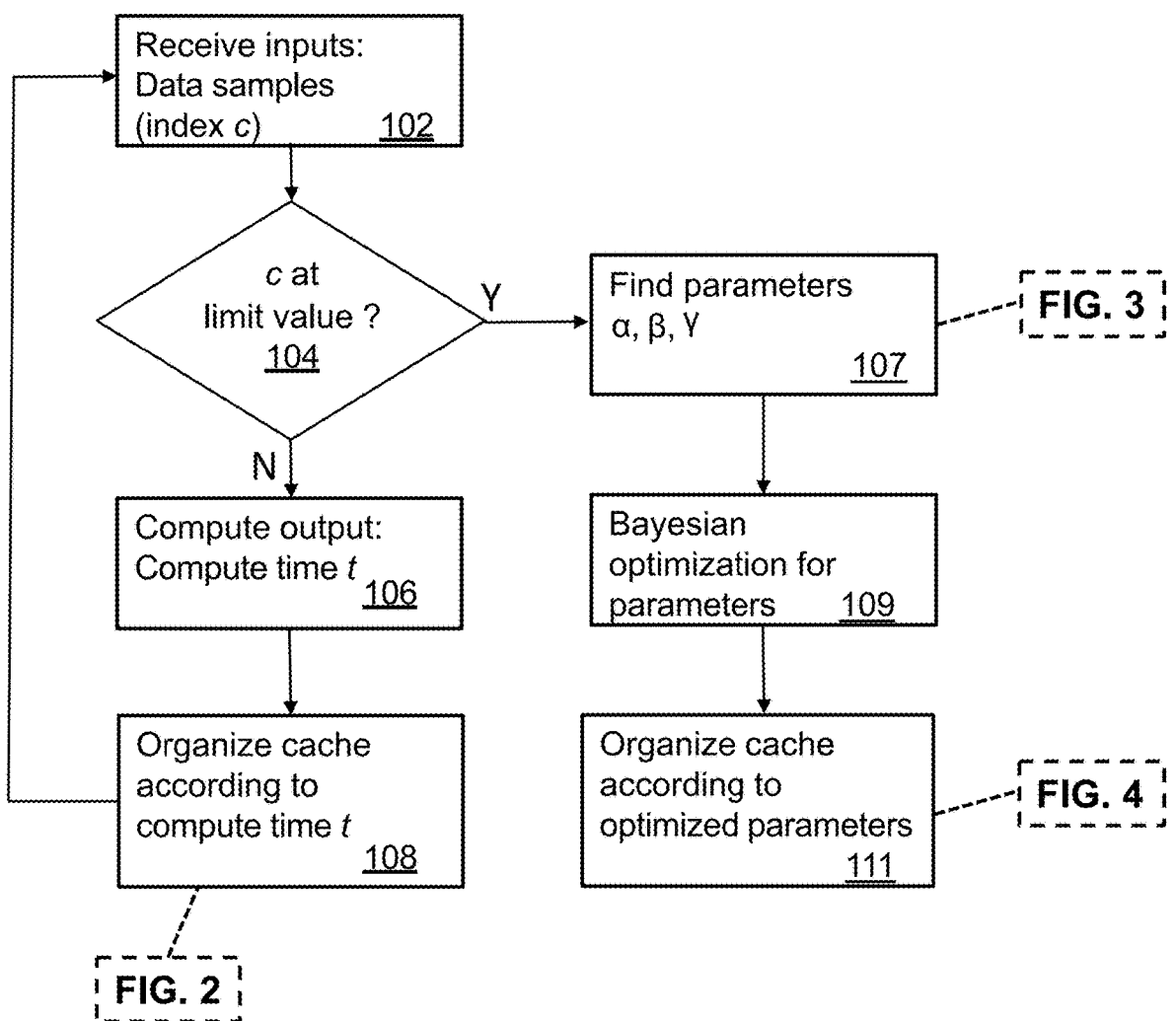
FIG. 1 is a flowchart depicting a procedure for implementing caching strategies based on the index value of an element (an input to a model) and one or more of execution time, frequency and order, in accordance with embodiments of the disclosure.
FIG. 2 is a flowchart depicting a procedure for computing and caching outputs of a model using a caching strategy based on execution time while the index is less than a limit value, in accordance with embodiments of the disclosure.
FIG. 3 is a flowchart depicting a procedure for adjusting scaling parameters using a Bayesian optimization algorithm to compute a weighted score for elements in a cache, in accordance with additional embodiments of the disclosure.
FIG. 4 is a flowchart depicting a procedure for removing elements from a cache based on a total weighted score involving execution time, frequency and retention and the scaling parameters, in accordance with further embodiments of the disclosure.
Figure 2:
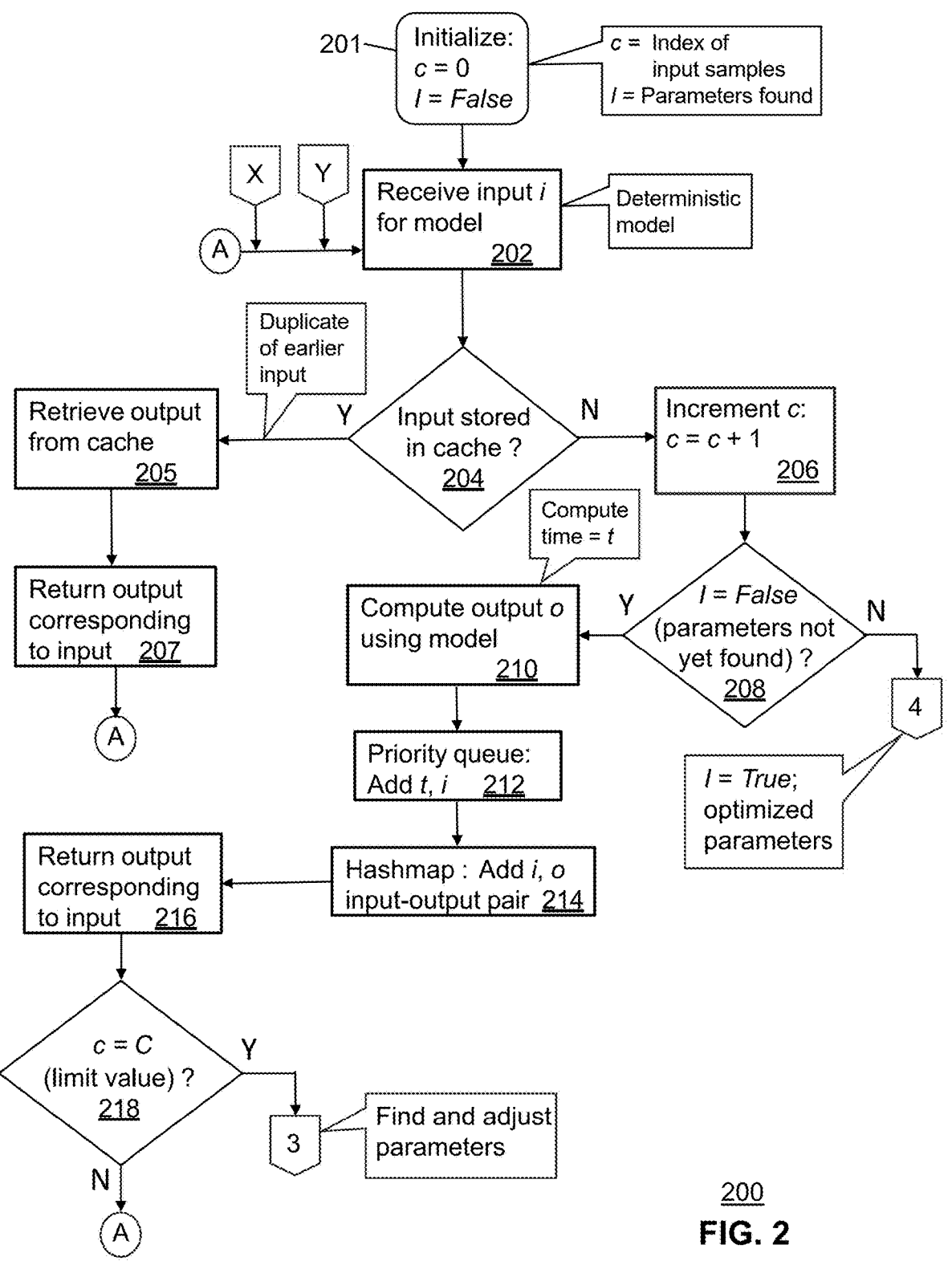
Figure 3:
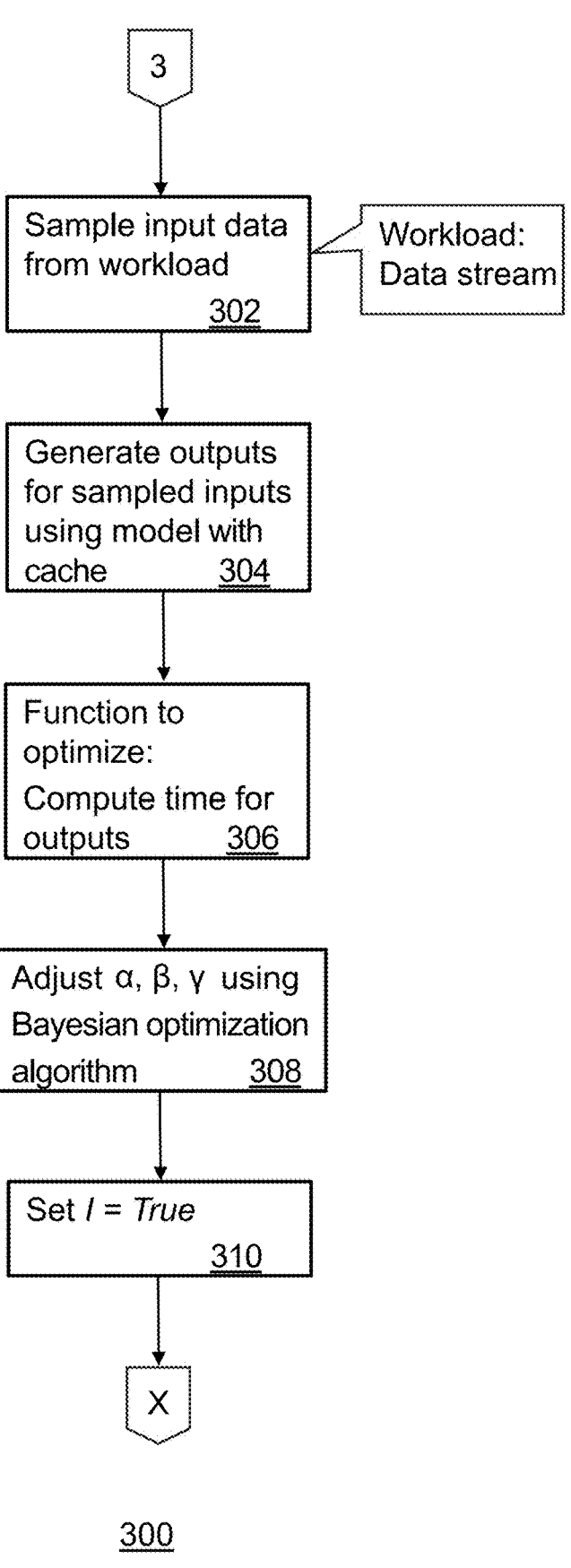
Figure 4:
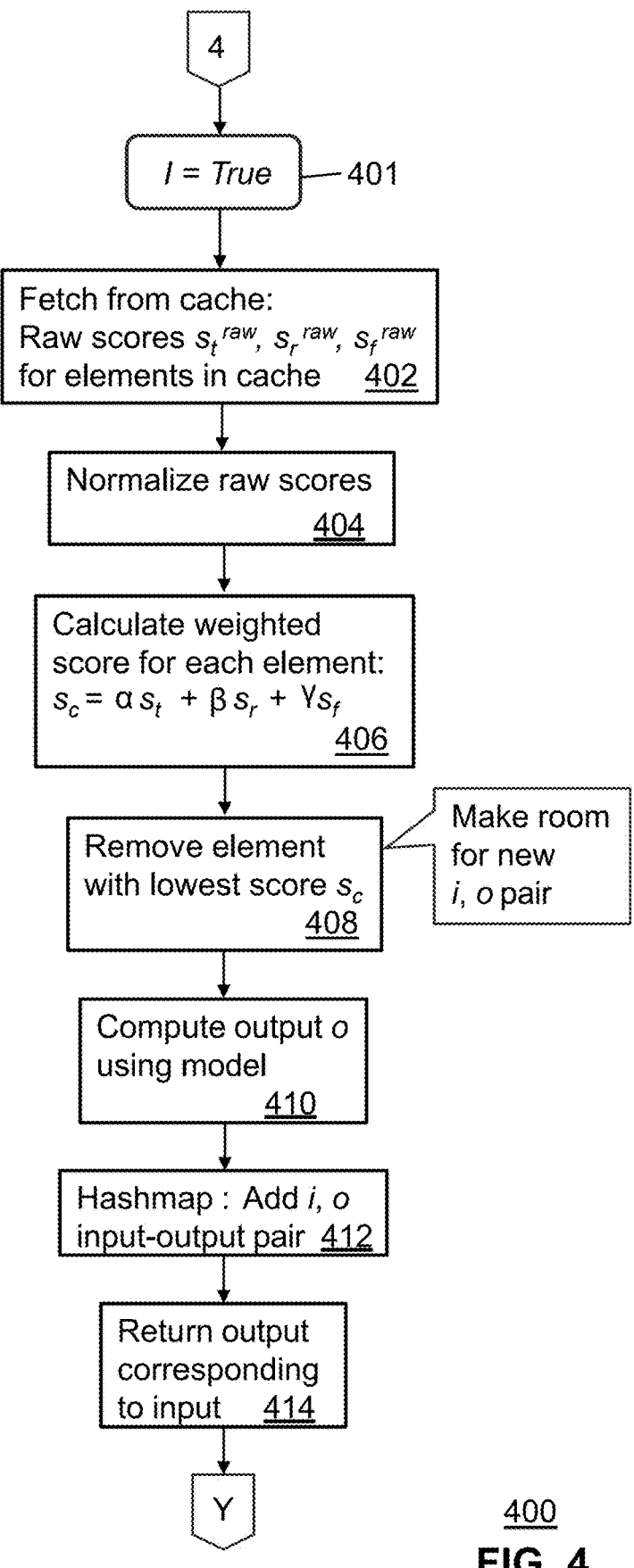

In accordance with aspects of the disclosure, an optimized caching procedure is performed that does not require prior knowledge of the dataset distribution. FIG. 1 is a flowchart 100 depicting an outline of a procedure for building and organizing a cache, in accordance with embodiments of the disclosure. A processing system receives inputs (data samples) with an index c (step 102); the input and corresponding output are added to the cache if the input has not been previously encountered. If (step 104/N) the index c has not reached a limit value C, the output is computed with an execution time t (step 106), and the cache is organized according to the compute time t (step 108); generally cache elements with long compute times are retained in the cache (refer to FIG. 2, discussed below). At this stage the data distribution is not known.

If (step 104/Y) the index c has reached the limit value, the processing system invokes a procedure (step 107) to set the cache parameters a, B, Y (refer to FIG. 3, discussed below). In various embodiments, this is done using a Bayesian optimization algorithm (step 109). The cache is then organized (step 111) using the optimized parameters (refer to FIG. 4, discussed below).

2. Adding Elements to the Cache

FIG. 2 is a flowchart depicting a procedure 200 for adding elements to a cache with a limited size in accordance with embodiments of the disclosure. In various embodiments, a hashmap stores inputs and outputs (i, o) as key value pairs.

The cache is initialized 201 in a procedure that includes setting a counter c to 0 and setting an indicator I to "False" indicating that the parameters $\alpha$, $\beta$, $\gamma$ have not yet been optimized. A processing system receives an input i for a deterministic model (step 202) and determines (step 204) whether the input is already stored in the cache.

If the input is stored in the cache, the new input is a duplicate of an earlier input, and the corresponding output o is also already stored in the cache; in this embodiment, the output o has been computed from the model, based on the input i with computation time t, for storage in the cache along with input i. The system then retrieves the output from the cache (step 205) and returns the output corresponding to the input (step 207).

If the input is not stored in the cache (for example, the input i is encountered for the first time), the counter c is incremented by 1 (step 206). If (step 208) I is False (that is, the parameters have not yet been set and optimized), the output o is computed for the new input i (step 210). In an embodiment, the input i and compute time t are added to a priority queue (step 212) in which the priority order is according to the compute time t (i.e. the time taken by the model to generate the output from the input), and the input-output pair (i, o) is added to the hashmap (step 214). The system then returns the output corresponding to the input (step 216).

If the counter c has not yet reached the limit value C (step 218), the processing system can receive a new input and continue to build the cache. If, however, the limit value C has been reached, a new procedure is invoked to find and optimize the cache parameters $\alpha$, $\beta$, $\gamma$.

3. Finding and Optimizing Cache Parameters

FIG. 3 is a flowchart depicting a procedure 300 for setting and adjusting the cache parameters $\alpha$, $\beta$, $\gamma$ in order to ensure optimal performance of the cache. In various embodiments, the problem of finding the cache parameters is modeled for a given workload using a Bayesian optimization procedure.

In step 302, input data is sampled from the workload, outputs are then generated for the sampled inputs, using the model and the cache (step 304). The function to optimize is the compute time, i.e. the time required by the model (using the cache) to generate the outputs (step 306). This optimization is performed by tuning the parameters $\alpha$, $\beta$, $\gamma$ according to the Bayesian optimization algorithm (step 308). The indicator I is then set to "True" (step 310). The cache is subsequently organized using the caching score $s_c = \alpha s_t + \beta s_r + \gamma s_f$.

4. Using the Cache Parameters; Removing an Element from the Cache

FIG. 4 is a flowchart depicting a procedure 400 for using the optimized cache parameters and for removing elements from the cache, in accordance with embodiments of the disclosure. Procedure 400 is invoked 401 when the indicator I is "True".

In step 402, raw scores are fetched for each element of the cache. The raw scores are calculated as follows:

$$s_t^{raw}$$

is the execution time in seconds required for the model to produce and output for a given input;

$$s_r^{raw}$$

represents the usage of an element in the cache, expressed as a number of iterations over which the element has been retained in the cache. In an embodiment, a processing system maintains a counter for the number of inputs obtained by the cache in a recent period of time. The $$s_r^{raw}$$

of a new element added to (or an existing element requested from) the cache is assigned the most recent value of this counter;

$$s_f^{raw}$$

is the usage frequency or an element in the cache. In an embodiment, the usage frequency of a new element added to the cache is zero; each time a given element is requested from the cache, $$s_f^{raw}$$

is incremented by 1 for that element.

In various embodiments, a hashmap stores inputs with raw scores and outputs $$\left(s_t^{raw}, s_r^{raw}, s_f^{raw}, o\right)$$

as key value pairs.

Normalized scores are then calculated (step 404) by min-max normalization of the raw score values. This is done to bring the score values into the range [0, 1]. In various embodiments, a normalization procedure is done each time the cache is updated. The time required for the normalization procedure is generally O(N), where N is the size of the cache; N is assumed to be much smaller than the size of the dataset M:N<<M.

A weighted score for each element in the cache is calculated (step 406), based on the normalized scores and the optimized cache parameters:

$$s_c = \alpha s_t + \beta s_r + \gamma s_f$$

The element with the lowest weighted score $s_c$ is removed from the cache (step 408). The output o is computed from the input i using the model (step 410); in an embodiment, The input i and output o are added to the hashmap (step 412). The system then returns the output corresponding to the input (step 414).

5. Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depend on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria are met.

In a software implementation, when a machine learning model is referred to as receiving an input, being executed, and/or generating an output or prediction, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of the best breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

6. Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neurons.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input.

For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

7. Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as a vector. Training data comprises multiple inputs, each being referred to as a sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Fewer neurons means fewer activation values need be computed, and/or fewer derivative values need be computed during training.

Properties of matrices used to implement a neural network correspond to neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in a matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that are not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

8. Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depend on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occur as explained above.

9. Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

10. Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

11. Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

12. Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
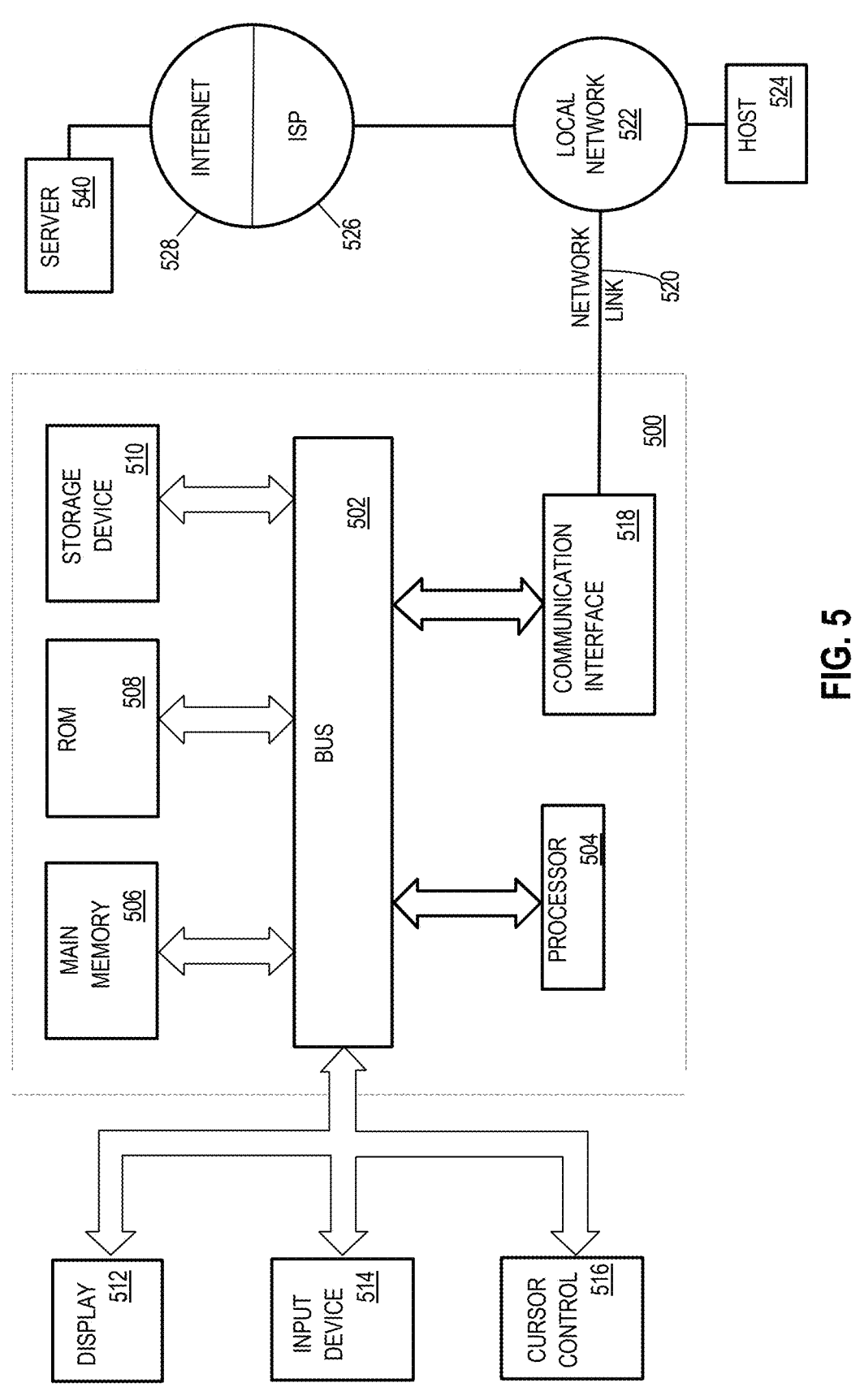
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 540 might transmit a requested code for an application program through Internet 528, ISP 526, local network 522 and communication interface 518.

The received code may be executed by processor 504 as it is received, and/or stored in storage device 510, or other non-volatile storage for later execution.

13. Software Overview

Figure 6:
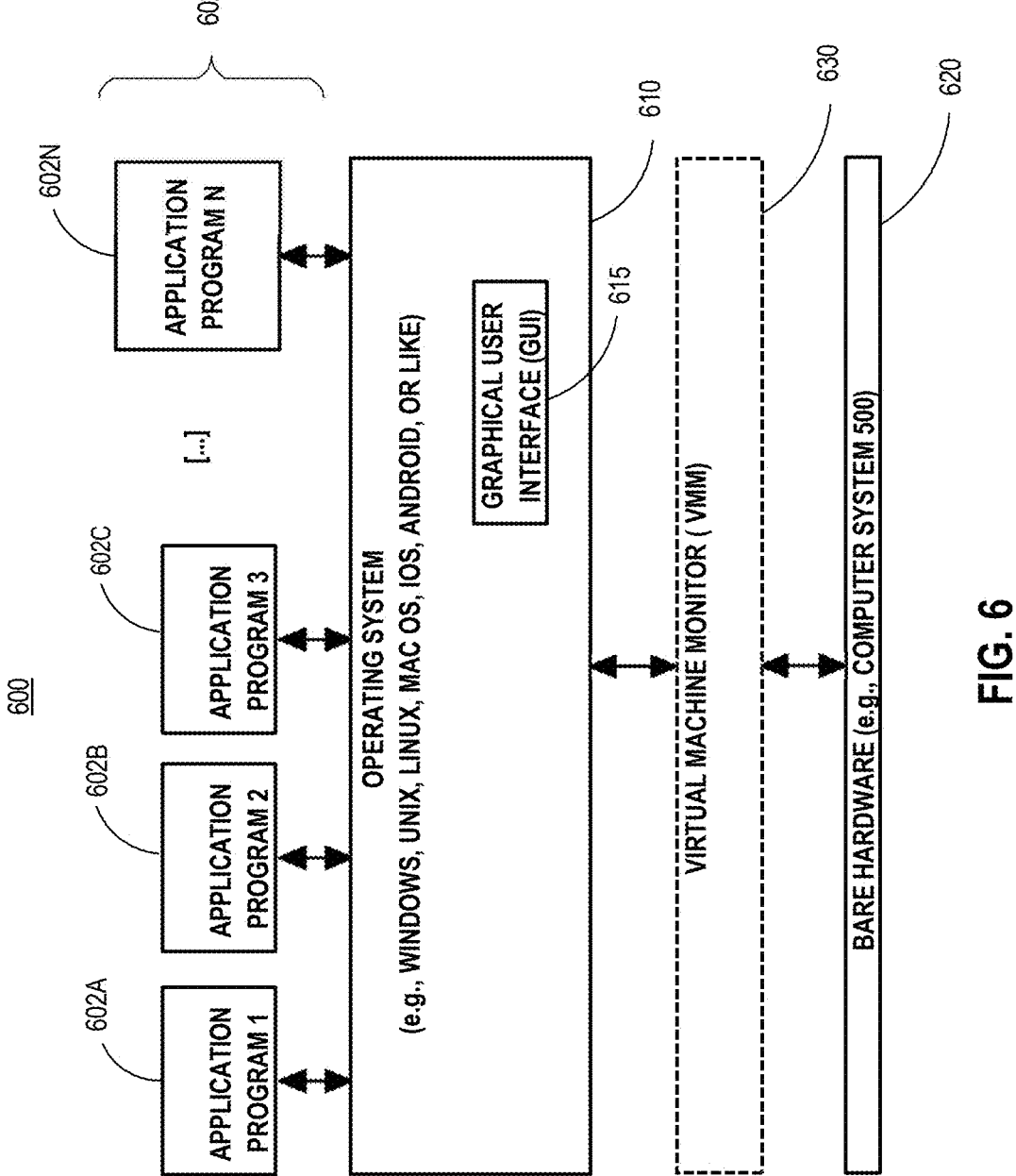
FIG. 6 is a block diagram of a basic software system that may be employed for controlling the operation of a computer system upon which an embodiment of the invention may be implemented.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system and may run under the control of other programs being executed on the computer system.

14. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving an input for a deterministic model, the input comprising data from a data stream, the input having an index value;
   in accordance with the input not being stored in a cache:
   computing an output from the model based on the input,
   storing the input and the output in the cache as an element of the cache, and in accordance with the index value being at a limit value:

using an optimization algorithm to determine a set of parameters associated with the cache, wherein the algorithm optimizes a function including a time taken by the model to generate outputs from a set of inputs sampled from the data stream;

calculating a caching score associated with each element of the cache, wherein the caching score for an element comprises a sum of a first product of a first score related to the element and a first parameter of the set of parameters, a second product of a second score related to the element and a second parameter of the set of parameters, and a third product of a third score related to the element and a third parameter of the set of parameters; and subsequently, in accordance with receiving an additional input not stored in the cache, removing from the cache the element having the lowest caching score.

2. The computer-implemented method of claim 1, wherein the algorithm comprises a Bayesian optimization algorithm.

3. The computer-implemented method of claim 1, wherein elements of the cache have a priority order according to the time taken by the model to generate the output from the input.

4. The computer-implemented method of claim 1, wherein the cache comprises a plurality of elements each comprising an input-output pair, wherein each input-output pair in the plurality of elements is stored in a hashmap.

5. The computer-implemented method of claim 4, wherein each input-output pair comprises a key value pair stored in the hashmap.

6. The computer-implemented method of claim 1, further comprising calculating a first normalized score, a second normalized score and a third normalized score based on the first score, the second score and the third score respectively.

7. The computer-implemented method of claim 6, wherein the calculating comprises a min-max normalization procedure.

8. The computer-implemented method of claim 1, wherein the first, second, third scores respectively correspond to the time taken by the model to generate the output, a usage of the element expressed as a number of iterations over which the element has been retained in the cache, and a frequency of usage of the element.

9. A non-transitory computer-readable medium comprising instructions executable by a processor to:

receive an input for a deterministic model, the input comprising data from a data stream, the input having an index value;

determining whether the input is stored in a cache;

in accordance with the input not being stored in the cache:

compute an output from the model based on the input, store the input and the output in the cache as an element of the cache, and determine whether the index value is at a limit value;

in accordance with the index value being at the limit value:

use an algorithm to determine a set of parameters associated with the cache, wherein the algorithm optimizes a function including a time taken by the model to generate outputs from a set of inputs sampled from the data stream;

calculate a caching score associated with each element of the cache, wherein the caching score for an element comprises a sum of a first product of a first score related to the element and a first parameter of the set of parameters, a second product of a second score related to the element and a second parameter of the set of parameters, and a third product of a third score related to the element and a third parameter of the set of parameters; and subsequently, in accordance with receiving an additional input not stored in the cache, remove from the cache the element having the lowest caching score.

10. The non-transitory computer-readable medium of claim 9, wherein the algorithm comprises a Bayesian optimization algorithm.

11. The non-transitory computer-readable medium of claim 9, further comprising instructions executable by the processor to:

store the input and the output in the cache, in accordance with the input not being stored in the cache and the index value being less than the limit value, the elements of the cache having a priority order according to the time taken by the model to generate the output from the input.

12. The non-transitory computer-readable medium of claim 9, wherein the cache comprises a plurality of elements each comprising an input-output pair, wherein each input-output pair in the plurality of elements is stored in a hashmap.

13. The non-transitory computer-readable medium of claim 9, further comprising instructions executable by the processor to calculate a first normalized score, a second normalized score and a third normalized score based on the first score, the second score and the third score respectively.

14. The non-transitory computer-readable medium of claim 9, wherein the first, second, third scores respectively correspond to the time taken by the model to generate the output, a usage of the element expressed as a number of iterations over which the element has been retained in the cache, and a frequency of usage of the element.

15. A system comprising:

a processor; and a memory that stores executable instructions that, when executed by the processor, facilitate performance of operations, the operations comprising:

receiving an input for a model, the input comprising data from a data stream, the input having an index value;

determining whether the input is stored in a cache;

in accordance with the input not being stored in the cache:

computing an output from the model based on the input, storing the input and the output in the cache as an element of the cache, and determining whether the index value is at a limit value;

in accordance with the index value being at the limit value:

using an algorithm to determine a set of parameters associated with the cache, wherein the algorithm optimizes a function including a time taken by the model to generate outputs from a set of inputs sampled from the data stream;

calculating a caching score associated with each element of the cache, wherein the caching score for an element comprises a sum of a first product of a first score related to the element and a first parameter of the set of parameters, a second product of a second score related to the element and a second parameter of the set of parameters, and a third product of a third score related to the element and a third parameter of the set of parameters; and subsequently, in accordance with receiving an additional input not stored in the cache, removing from the cache the element having the lowest caching score.

16. The system of claim 15, wherein the algorithm comprises a Bayesian optimization algorithm.

17. The system of claim 15, wherein the cache comprises a plurality of elements each comprising an input-output pair, wherein each input-output pair in the plurality of elements is stored in a hashmap.

18. The system of claim 15, further comprising calculating a first normalized score, a second normalized score and a third normalized score based on the first score, the second score and the third score respectively.

19. The system of claim 15, wherein the first, second, third scores respectively correspond to the time taken by the model to generate the output, a usage of the element expressed as a number of iterations over which the element has been retained in the cache, and a frequency of usage of the element.

* * * * *